US006778216B1

(12) United States Patent
Lin

(10) Patent No.: US 6,778,216 B1
(45) Date of Patent: Aug. 17, 2004

(54) METHOD AND APPARATUS FOR DIGITAL CAMERA REAL-TIME IMAGE CORRECTION IN PREVIEW MODE

(75) Inventor: Gene Chun-Yin Lin, Taipei (TW)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/534,805

(22) Filed: Mar. 24, 2000

Related U.S. Application Data

(60) Provisional application No. 60/126,092, filed on Mar. 25, 1999.

(51) Int. Cl.[7] .................................................. H04N 2/73
(52) U.S. Cl. ............................. 348/333.11; 348/333.12; 348/223.1
(58) Field of Search ....................... 348/207.99, 231.99, 348/231.3, 231.6, 222.1, 223.1, 229.1, 254, 333.01, 333.11, 333.12, 350, 220.1; 382/124, 167; 235/470

(56) References Cited

U.S. PATENT DOCUMENTS

| 5,216,493 | A | | 6/1993 | DiBella et al. | |
|---|---|---|---|---|---|
| 5,625,415 | A | * | 4/1997 | Ueno et al. | 348/350 |
| 5,748,766 | A | * | 5/1998 | Maase et al. | 382/124 |
| 2001/0043376 | A1 | * | 11/2001 | Kumada et al. | 358/504 |
| 2002/0168103 | A1 | * | 11/2002 | Shiraiwa | 382/167 |
| 2003/0189100 | A1 | * | 10/2003 | Yamada et al. | 235/470 |

FOREIGN PATENT DOCUMENTS

| EP | 0 683 596 A | | 11/1995 | |
|---|---|---|---|---|
| EP | 0 851 274 A | | 7/1998 | |
| JP | 10-248028 | * | 9/1998 | .......... H04N/5/222 |
| WO | WO 99 03264 A | | 1/1999 | |

OTHER PUBLICATIONS

C.A. Dunsmore, et al.; *A Low–Cost Megapixel Digital Camera Using High–Performance In–Camera Image Processing,* Proc. IS&T's Pics Conf., May 17, 1998, pp. 67–70.

* cited by examiner

*Primary Examiner*—Tuan Ho
(74) *Attorney, Agent, or Firm*—Robert D. Marshall, Jr.; W. James Brady, III; Frederick J. Telecky, Jr.

(57) ABSTRACT

A method for previewing an image in a camera prior to output. The method includes steps of gathering image data, storing the image data, calculating display parameters using the stored image data, storing the display parameters in a look-up table; and applying the display parameters in the look-up table to at least a portion of the image data to produce preview image data. The display parameters can be quickly calculated using a digital signal processor to achieve real-time image previewing. The parameters used in an embodiment camera are vertical down sampling (51) white balance and gain control (52), horizontal up/down sampling (53), and color space conversion and gamma correction (55). The resulting preview processed image may be stored in memory via an interface (56) and viewed via a preview display. Once calculated using a preview algorithm run on a digital signal processor, these parameters can be combined in one or more look-up tables that can be updated by the digital signal processor as imaging conditions demand.

13 Claims, 6 Drawing Sheets

METHOD AND APPARATUS FOR DIGITAL CAMERA REAL-TIME IMAGE CORRECTION IN PREVIEW MODE

CROSS-REFERENCE TO CO-PENDING APPLICATION

This application claims the benefit of U.S. Provisional Application No. 60/126,092, filed on Mar. 25, 1999, the entire disclosure of which is hereby incorporated by reference.

FIELD OF THE INVENTION

The invention relates to digital image processing, and, more particularly, to a method and apparatus for processing real-time raw image data and displaying the processed pixel signals in a real-time manner with programmability and high quality.

BACKGROUND OF THE INVENTION

In a conventional digital signal processing system such as a digital still camera, an image sensor within an image-gathering means, such as a charge-coupled device (CCD) or complementary metal-oxide-semiconductor (CMOS) sensor having a color filter array that provides a spatially color-sampled image, is exposed to image light and the resultant analog image information is converted by an analog-to-digital converter (ADC) to digital image signals. The digital image signals are then transferred to a memory such as a synchronous DRAM (SDRAM) or DRAM for temporary storage. Some digital still cameras have color liquid crystal displays (LCD), which are also spatially color-sampled devices. As the user typically intends to preview the image prior to capturing it for storage, the digital image signals are transferred to a preview mode apparatus (hereinafter referred to as a preview engine) for previewing the picture frame prior to capturing the image.

Usually, as the user would like to immediately preview the image of the picture on the LCD as the camera is moved over the subject, real-time operation in the preview mode is practically essential. That is to say, for typical digital still cameras, the processing used in the preview mode must be done rapidly, such as 60 images per second to avoid any perceivable display delay. The term "real-time" is applied herein to operations achieved without substantial perceivable display delay.

Despite the fact that the image quality of the displayed image is limited by the resolution and color gamut of the LCD screen of the LCD display, it is desirable for the preview image to reflect the qualities of the final image produced by the camera. To accomplish this, the preview engine would preferably include the functions used to produce the final image, functions such as white balance, auto exposure, auto focus, gain control, gamma correction, and color space conversion. The enhanced preview image would also, of course, preferably be accomplished without added complexity or cost. Therefore, there is a need in the industry for a method and apparatus capable of upgrading the quality of the images previewed on the LCD display and to satisfy the desire for real-time operation in the preview mode by less complex and more cost-effective configurations.

SUMMARY OF THE INVENTION

In one embodiment of the invention, a method for previewing an image in a camera prior to output is disclosed. The method includes steps of gathering image data, storing the image data, calculating display parameters using the stored image data, storing the display parameters in a look-up table; and applying the display parameters in the look-up table to at least a portion of the image data to produce preview image data. The display parameters can be quickly calculated using a digital signal processor to achieve real-time image previewing. The parameters used in an embodiment camera are white balance, gain control, gamma correction, and color space conversion. Once calculated using a preview algorithm run on a digital signal processor, these parameters can be combined in one or more look-up tables that can be updated by the digital signal processor as imaging conditions demand.

In another embodiment of the invention, a method for previewing an image in a digital camera prior to output is disclosed. The method includes the steps of gathering image data, digitizing the image data, storing the digitized image data, sampling a portion of the digitized image data, calculating white balance adjustment and gain control parameters using the stored digitized image data, and storing the white balance adjustment and gain control parameters in a look-up table; and applying the white balance adjustment and gain control parameters in the look-up table to the portion of the digitized image data to produce preview image data.

In still another embodiment of the invention, a digital camera is disclosed. The digital camera includes an image-gathering device, a preview engine coupled to the image-gathering device, wherein the preview engine includes a look-up table, a display coupled to the preview engine, a storage device coupled to the image-gathering device; and a processor coupled to the look-up table and to the storage device.

An advantage of the invention is that it enables real-time processing of desirable imaging features such as white balance, gain control, gamma correction, and color interpolation.

BRIEF DESCRIPTION OF THE DRAWINGS

Other aspects and advantages of the invention will become apparent from the following descriptions taken in conjunction with the accompanying drawings, wherein.

DETAILED DESCRIPTION OF PREFERRED EMBODIMENTS

The embodiments of the invention described below provide a system for producing high-quality preview images in a camera in real time. In one embodiment of the invention, the processing speed of a digital signal processor (DSP) is used to update look-up tables in real time. The use of look-up tables in conventional systems has thus far not been practical, due in part to the inability of a microprocessor to update the table fast enough to avoid a perceptible delay as the subject field of the image changes. Indeed, the digital signal processor is capable of processing algorithms related to white balance, gain control, gamma correction, sampling, and color space conversion, for example, in real time. These functions can be used to produce digital zoom, digital auto exposure, and color enhancement functions that have traditionally been accomplished using either hard-wired, inflexible circuits, or much slower microprocessors. The digital signal processor is capable of performing the calculation tasks using algorithms specifically designed for the preview image and is also capable of performing the calculations for the more complex algorithm typically used to produce the very high-quality image that is the output of a system such as a digital still camera.

An embodiment of the present invention is described below with reference to the accompanying drawings.

Figure 1:
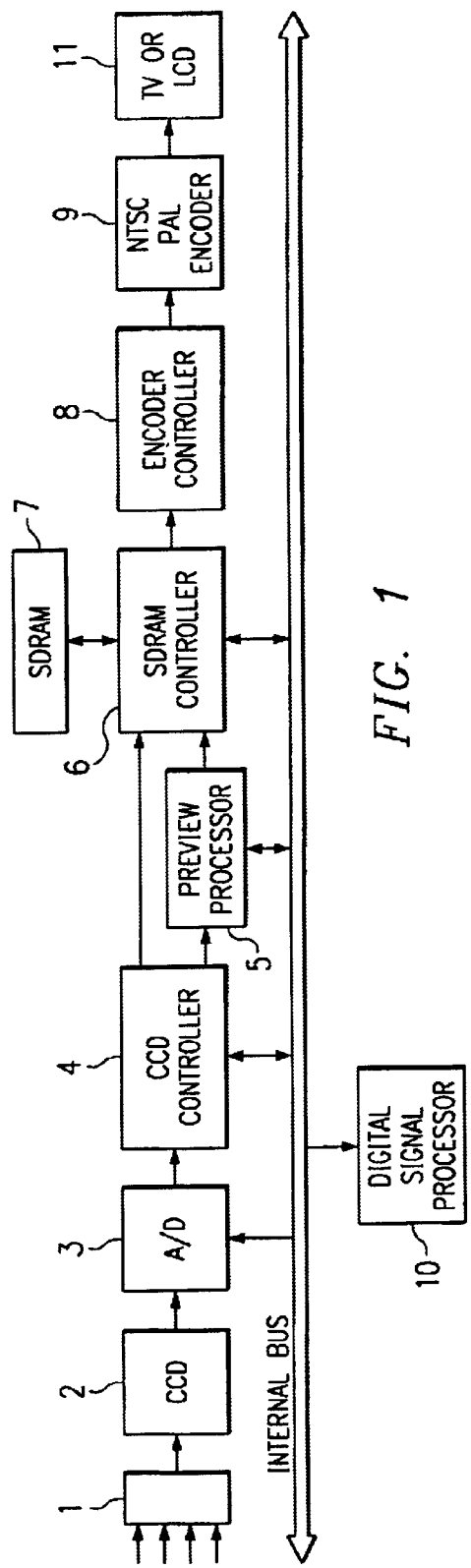
FIG. 1 shows a simplified schematic block diagram of an improved digital still camera according to an embodiment of the present invention.

Referring to FIG. 1, a first embodiment of the invention provides a preview engine 5 coupled between a CCD controller 4 and an SDRAM controller 6 for previewing the image gathered by a CCD device 2. Note that while embodiments described herein relate to a digital still camera, the invention is not limited to digital still cameras. For example, the present invention may suitable for any equipment for taking data like an image, processing the data to produce a modified form of the data, and previewing the modified form of the data prior to using the data or storing it in a memory.

FIG. 1 depicts a simplified schematic block diagram of a system according to the present invention. Reference numeral 1 denotes a photographing lens optical system receiving the image light of the photographed object. The image is captured when the image light is exposed to a charge-coupled device (CCD) 2, which converts the image light to electronic analog image signals. The CCD 2 has a two-dimensional array of image pixels, which is covered by a Bayer pattern (Red-Green/Green-Blue) of color filters for every four pixels in square formation. In addition to the Bayer pattern, several types of color filter array arrangements such as Red-Green-Blue stripe type, complementary type, and so on, can be configured in the CCD 2. An analog-to-digital (A/D) converter 3 transforms the analog image signals into digital image data. A CCD controller 4 may include a color separator (not shown) to separate pixel-sequential image signals into color-separated pixel signals, such as primary red (R), green (G) and blue (B) signals in accordance with default pixel clocks (described below). The color-separated pixel signals are then transferred to a preview engine 5. Preview engine 5 prepares the color-separated pixel signals for previewing on a TV or LCD 11, for example. The color-separated pixel signals are also sent via the SDRAM controller 6 to a semiconductor memory such as a synchronous dynamic random access memory (SDRAM) 7 for temporary storage. Digital signal processor (DSP) 10 is coupled to the memory 7 and accesses the data there in to perform the calculations used in the preview algorithm of preview engine 5. Digital signal processor 10 also performs the calculations for the algorithm used to prepare the final high-quality image that is the output of the camera or system. This enhanced algorithm is typically stored in flash ROM on the digital signal processor integrated circuit. To be displayed on the TV or LCD 11, the color-separated pixel signals from the SDRAM 6 are further processed by an encoder controller 8 and an NTSC/PAL encoder 9.

In this embodiment of the invention, the CCD 2 has a resolution of 1680 by 2048 pixels while a display of the NTSC type has a resolution of 525 by 768 pixels. In other words, the LCD or NTSC type display 11 has fewer display pixels than the CCD 2. Therefore, in order to display the pixel signals obtained from the CCD 2 in an NTSC standard TV or NTSC compatible LCD 11, the pixel signals are truncated or down sampled.

Figure 2:
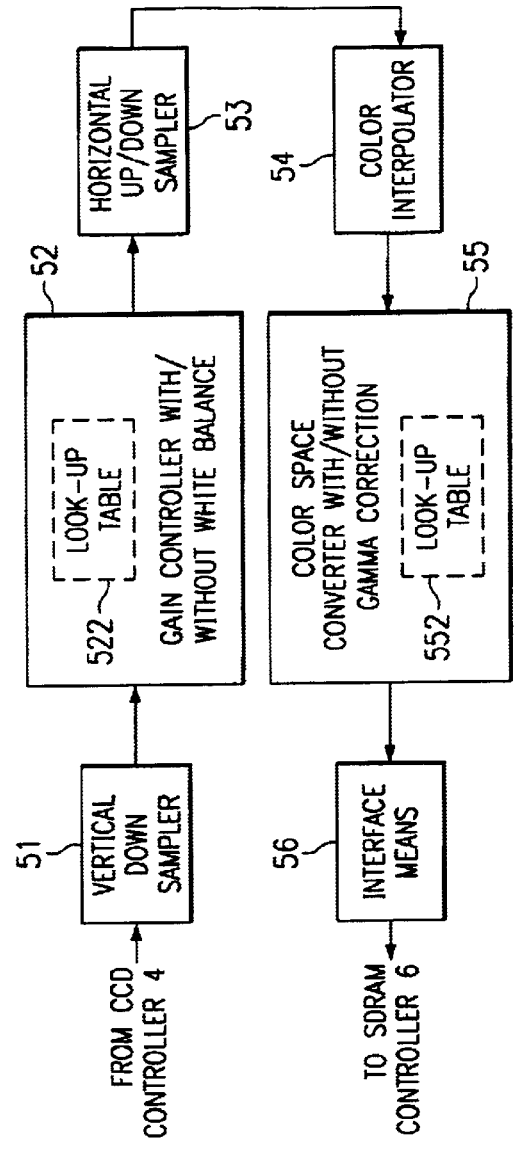
FIG. 2 shows the block diagram of the preview engine of FIG. 1 according to the present invention.

A block diagram of the embodiment preview engine 5 is shown in FIG. 2. The preview engine 5 comprises a vertical down sampler 51 for truncating or down-sampling the pixel signals from the CCD 2. Downsampling can be used to create a zooming effect that increases and decreases the size of the image viewed by the system user. In this embodiment only vertical downsampling is used. This is acceptable for a preview processor because the vertical resolution needed for a preview image in this embodiment is less than that captured by the image-gathering device (CCD 2). In this embodiment, there is little need for up sampling or interpolating the image data, though one skilled in the art will appreciate that up-sampling could be incorporated in the design of FIG. 2. Even without up sampling, the preview image can be effectively "zoomed" by simply varying the degree of downsampling of the image. The vertical down sampler 51 selects the digital pixel signals from the CCD 2 to match the vertical resolution of the display device 11.

Figure 3A:
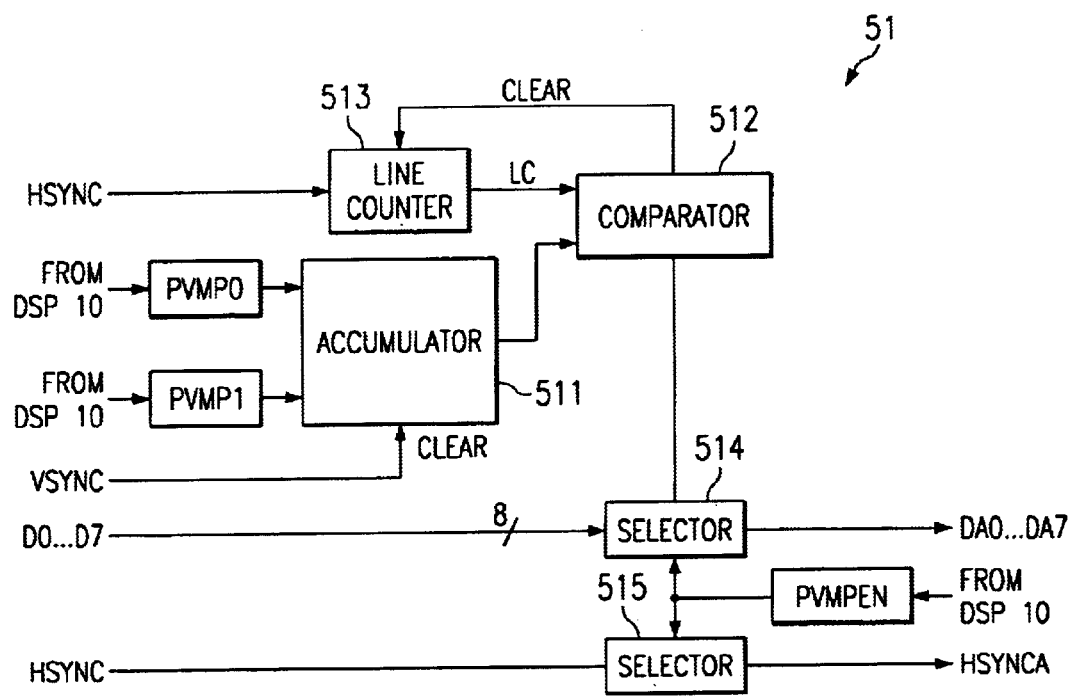
FIG. 3A shows the block diagram of the vertical down sampler of FIG. 2.
Figure 3B:
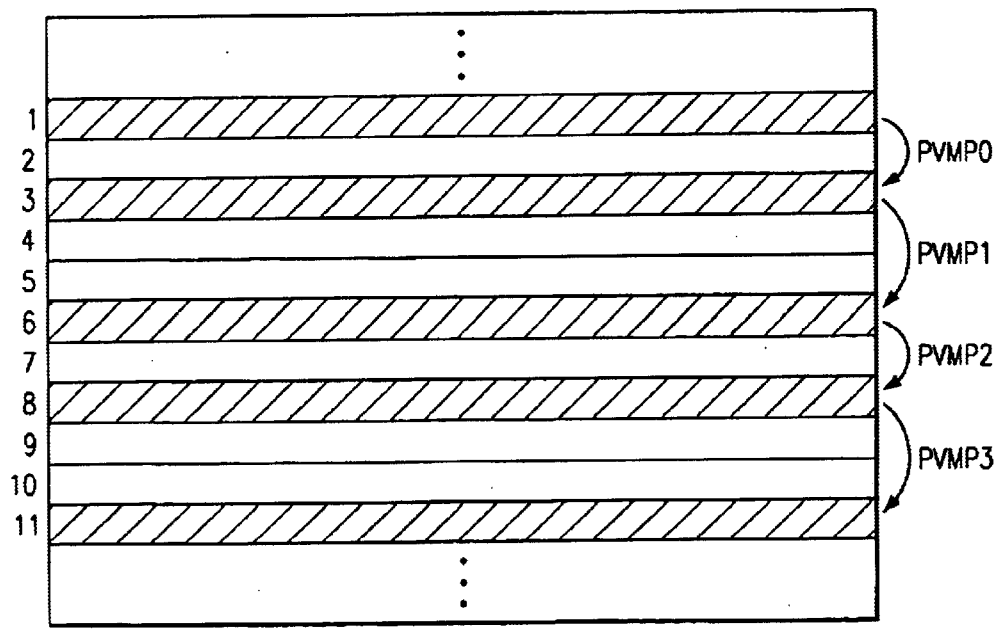
FIG. 3B shows the sampling diagram of the vertical down sampler of FIG. 3A.

Referring to FIG. 3A, which shows the block diagram of the vertical down sampler 51, the digital pixel signals obtained from the CCD 2 are represented by 8-bit data lines D0 . . . D7. Two registers, PVMP0 and PVMP1, can be programmed by a digital signal processor 10, a microprocessor, or other similar means to control the vertical down-sampling scheme as shown in FIG. 3B. In FIG. 3B, PVMP0 is set to a value of 2 and PVMP1 is set to a value of 3, which results in ⅖ sampling. In other words, 1680 lines will be down sampled to 672 lines. If PVMP0 and PVMP1 are both set to 2, the downsampling rate is ¾ and the 1680 lines are downsampled to 840 lines. In the vertical down sampler 51, an accumulator 511 alternately sums digital values stored in the registers PVMP0 and PVMP1 and outputs the summed value to a comparator 512 for comparing with the line count value LC from a line counter 513. Line counter 513 generates the number of the current horizontal line in response to a horizontal synchronous clock HSYNC. If the summed value matches the line counter value, the comparator 512 enables a selector 514 to select the currently matched horizontal line of the digital pixel signals and to send its outputs on the 8-bit data lines DA0 . . . DA7. As the current horizontal line reaches the edge of the image frame, the vertical synchronous clock VSYNC will clear the accumulator 511 to reset its initial state. In this way, the vertical extent of the image frame gathered by the CCD 2 can be truncated or down sampled to meet the limitation of a display such as a TV or LCD.

Referring back to FIG. 2 again, the vertically down sampled digital pixel signals obtained from the vertical down sampler 51 over the data lines DA0 . . . DA7 are then sent to gain controller 52. The gain of pixel signals obtained from the CCD 2 often requires adjustment due to the defective image pixels on the CCD 2 or due to the dimmed environment in which the picture frame is taken.

Figure 4:
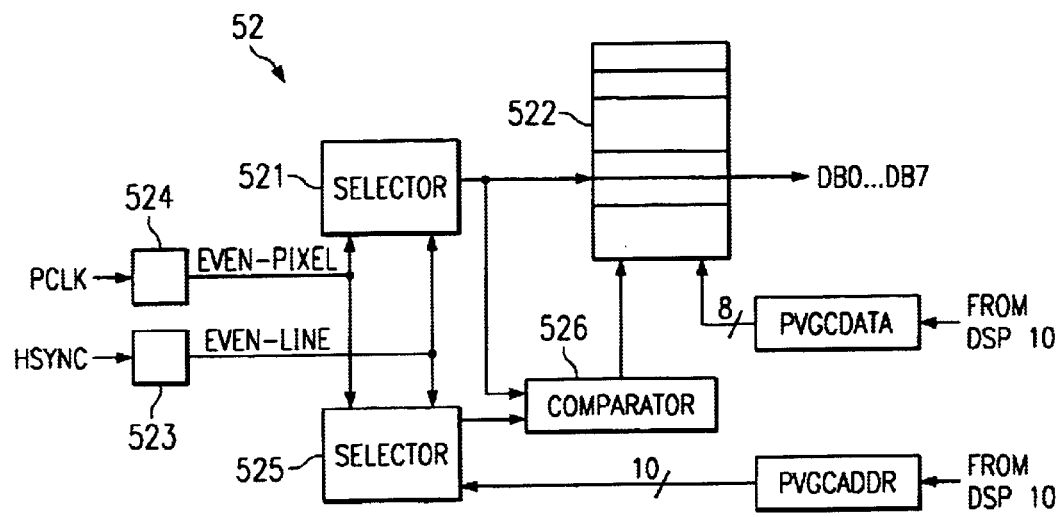
FIG. 4 shows the block diagram of the gain controller of FIG. 2 according to the present invention.

Gain control is an electronics means of performing the auto-exposure feature of a digital camera. It is used in the preview engine 5 to allow the preview image viewed by the camera user to adjust to changing light conditions as the camera is moved over a subject. As shown in FIG. 4, the gain controller 52 has a look-up table (LUT) 522, which is addressable by the digital signal processor 10 by means of two registers of eight bits, PVGCDATA and PVGCADDR. The LUT 522 may be implemented by a dual-ported RAM or other appropriate memory device, which can be configured as four memory sections, for example, each of which has 256 locations corresponding to the 256 ($2^8$) possible intensity levels presented by the data lines DA0 . . . DA7 for each pixel. In other words, the LUT 522 in effect can have four dedicated sub look-up tables for the respective primary colors in the Bayer pattern (RG/GB). The digital gained values in each of the 4×256 locations of the LUT 522 are pre-loaded by the digital signal processor 10 at any convenient time via a value register PVGCDATA and an address register PVGCADDR. In detail, a selector 521 first determines how the color and position of each of the pixels represented by the data lines DA0 . . . DA7 correspond to the color and position of an equivalent position in the Bayer pattern. This is done in response to two control signals, even_line and even_pixel. The selector 521 then sends a corresponding address signal to the LUT 522. The control signal even_line is generated through an inverter 523 by the horizontal synchronous clock HSYNC from the vertical down sampler 51 to indicate whether the current pixel represented by DA0 . . . DA7 is at an even-numbered pixel line or odd-numbered line on the CCD 2. The control signal even_pixel is generated through an inverter 524 by the current pixel clock PCLK, to indicate whether the current pixel represented by DA0 . . . DA7 is an even numbered pixel or odd numbered pixel at the line determined by the control line $even_{13}$ line. After the color and position of the current pixel represented by the data lines DA0 . . . DA7 are determined, the corresponding sub look-up table in the LUT 522 is then accessed and prompted to produce the value stored at the corresponding LUT location at the data lines DB0 . . . DB7 as the gained version of the pixel signals presented by the data lines DA0 . . . DA7.

The gain controller 52 further comprises a selector 525 having the same operation as the selector 521 to receive the address value set by the digital signal processor 10 from the address register PVGCADDR to generate another address signal. A comparator 526 compares these two address signals from the selectors 521 and 525 to determine whether they are different from one another. If the two address signals are different, the comparator sends a write-enable signal to the LUT 522 to allow the LUT to receive the calculated value by digital signal processor 10 and stored in register PVGCDATA. Such an arrangement is to prevent the digital value in the location of the LUT 522 addressed by the PVGCADDR from being located by the selector 521.

In this way, the pixel signals represented by the data lines DA0 . . . DA7 can be gain-controlled by a one-to-one color intensity mapping of the LUT 522. In addition, use of a digital signal processor's calculation power allows the LUT to be updated and accessed in real time. Furthermore, as mentioned above, the digital gained values in any location of the LUT 522 can be programmed through the registers PVGCDATA and PVGCADDR by the digital signal processor 10 such that the gain controller 52 can flexibly control gains for each pixel by adjusting the average of intensity levels of any one color stored in the 256 locations of the LUT 522. The gain can be controlled in a linear manner, gamma curve (which will be detailed hereinafter), or other manner.

According to one preferred embodiment of the present invention, by suitably setting the 4×256 digital values in the LUT 522 to average for all image pixels on the CCD 2, the gain controller 52 can achieve the additional advantage of white balance adjustment, which is important in preventing color saturation of the captured image. It should be noted that gain control can be performed at any convenient time during image processing before the R, G, and B signals are converted to color-difference signals (detailed below). However, gain control is preferably performed after the vertical down sampler 51 performs the vertical truncation of the image to avoid performing gain control on the omitted lines. It should be further noted that the implementation of the gain controller 52 as a dual-ported RAM is only one of several possible embodiments. It would be within the scope of the invention to perform the gain control in equivalent circuitry or to perform gain control in firmware.

Figure 5A:
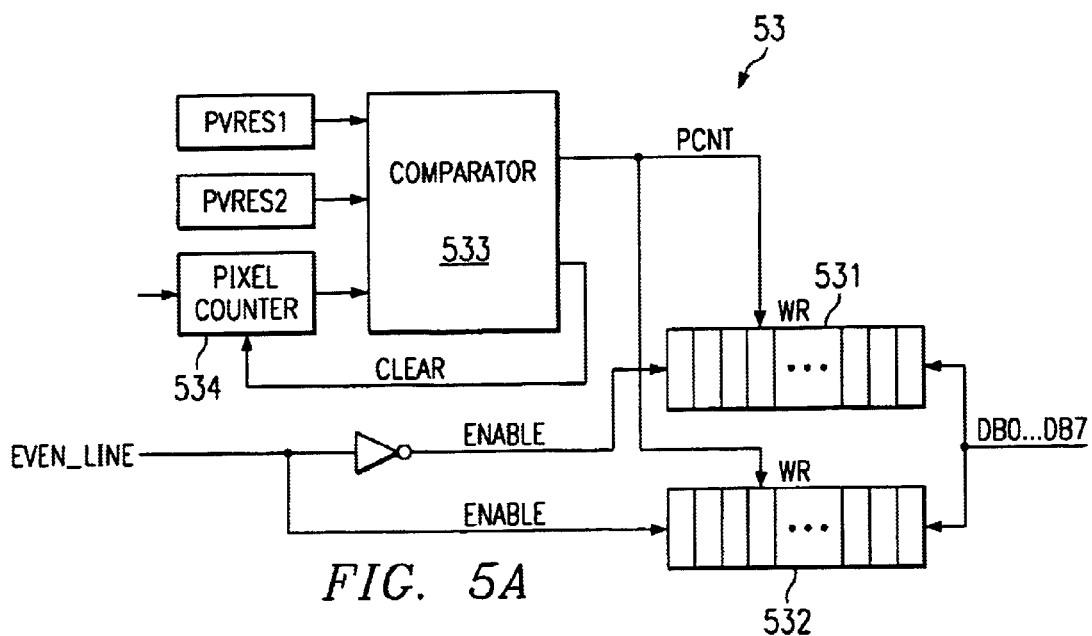
FIG. 5A shows the block diagram of the horizontal up/down sampler of FIG. 2 in write-in mode according to the present invention.

As shown in FIG. 2, the gain-controlled pixel signals represented by the data lines DB0 . . . DB7 are then sent to a horizontal up/down sampler 53. As mentioned above for vertical sampling, in addition to ensuring that the CCD image is sized to fit the display, horizontal sampling is also used to produce the camera's zoom effect. As opposed to the embodiment vertical sampling implementation, which is limited to downsampling, the horizontal sampling mode in this embodiment can be either down or up to allow zoom out and zoom in, respectively. Referring to FIG. 5A in which the horizontal up/down sampler 53 operates in a write-in mode, upon operation the gain-controlled pixel signals represented by the data lines DB0 . . . DB7 are alternately loaded into two line buffers, 531 and 532, in a horizontal line by line basis. Preferably, each of the line buffers is configured to be large enough, such as 2048 bytes, to accommodate one horizontal line of 1680 pixels in the CCD 2. The loading operation of these two line buffers are controlled by a select signal even_line and a location addressing signal PCNT. As with the case shown in FIG. 4, the value of select signal $even_{13}$ line representing that the current pixel represented by the data lines DB0 . . . DB7 is at an even-numbered line or odd-numbered line on the CCD 2 is enables one of these two line buffers 531 and 532. The horizontal down up/sampler 53 has two registers PVRES1 and PVRES2 programmable by the digital signal processor for addressing the vertical starting line and vertical ending line of the image region to be horizontally down sampled on the CCD 2. A comparator 533 compares the left limit value stored in the register PVRES1 and the right limit value stored in the register PVRES2 with the digital value from a pixel counter 534, which receives receiving the pixel clock PCLK. The comparison determines whether the current pixel represented by the data lines DB0 . . . DB7 is in the image region to be horizontally down sampled. The comparator 533 also generates the location-addressing signal PCNT corresponding to PCLK to locate the write-in location of the current pixel represented by the data lines DB0 . . . DB7. The configuration of the two line buffers is derived from the inventor's recognition that the Bayer pattern is the size of 2 by 2 pixels and that two rows of line buffers are sufficient to process those pixel signals obtained from the image pixels covered by color filters of the Bayer pattern. A single line buffer or more than two line buffers may be appropriate for other patterns or in other configurations.

Figure 5B:
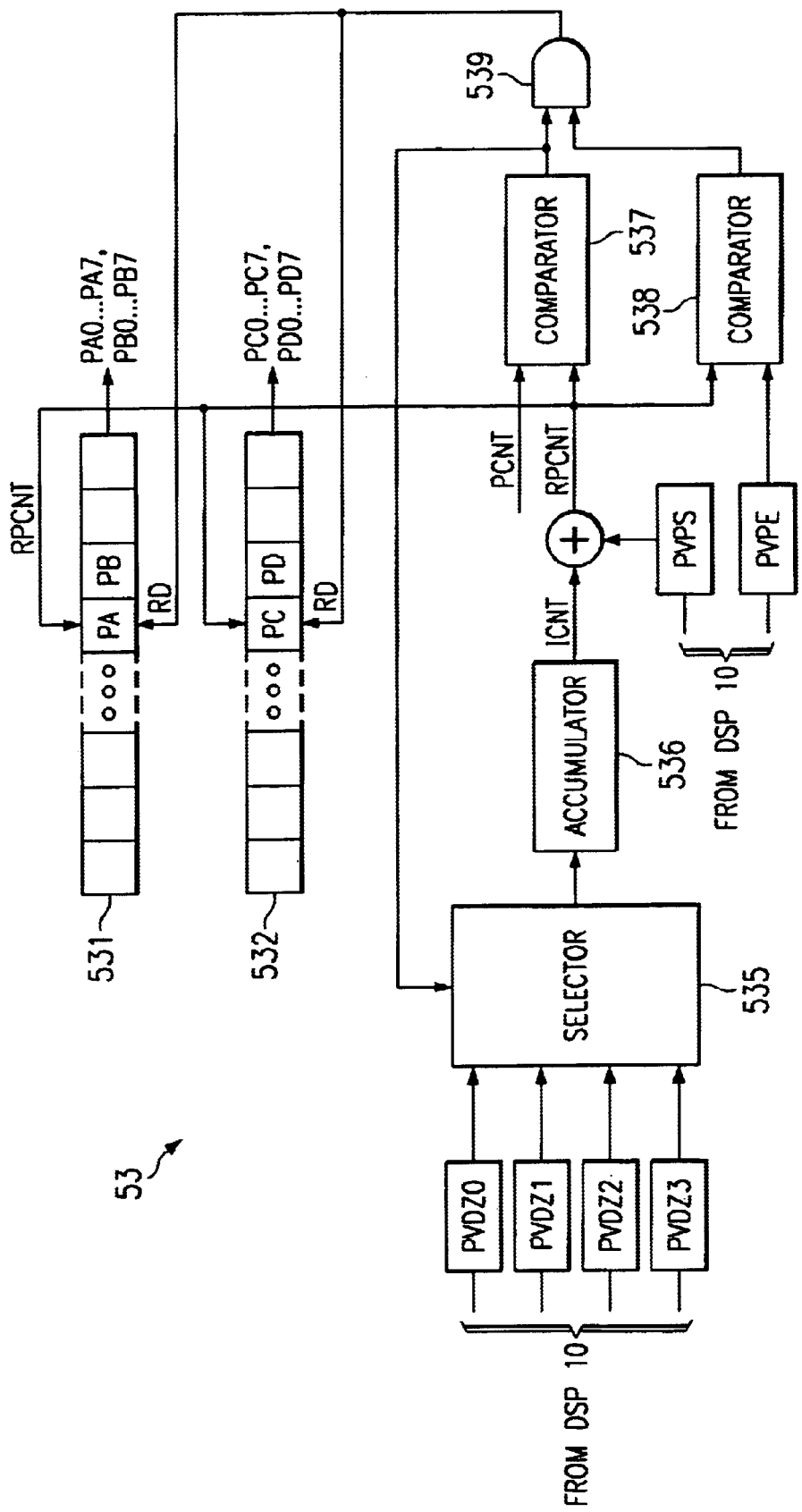
FIG. 5B shows the block diagram of the horizontal up/down sampler of FIG. 2 in read-out mode according to the present invention.

According to one embodiment of the invention, upon the read-out (sampling) operation, the gain-controlled pixel signals in the line buffers 531 and 532 are read out per block, i.e., four pixels, two each from line buffers 531 and 532. Refer to FIG. 5B, in which the horizontal up/down sampler 53 operates in a read-out mode. A selector 535 alternately and periodically selects an address locator stored in one of four two-bit pointing registers PVDZ0, PVDZ1, PVDZ2 and PVDZ3, which are programmed by the digital signal processor 10 to set the sampling method and the sampling rate thereof, to send selected address locator PVDZ to an accumulator 536. Each address locator is used to locate the starting address of a block in the two line buffers. The addition of the accumulated result ICNT output from the accumulator 536 with the line buffer starting address from a register PVPS generates an address pointer RPCNT. A comparator 537 compares the address pointer RPCNT with the PCNT last generated in the write-mode. If the RPCNT is greater than PCNT, it means that the address pointed by the RPCNT exceeds the address in which the last gain-controlled pixel signal has been written in the write-mode. The RPCNT can also be compared with the end address of the line buffers 531 and 532 from a register PVPE at a comparator 538 to ensure that the RPCNT is smaller than the ending address. When both of the comparators 537 and 538 generate an active high signal at an AND gate 539, the gain-controlled pixel signals at the locations located by the PCNT in these two registers 531 and 532 concurrently pointed to by the pointer RPCNT are read out (sampled) on a block basis, i.e., two adjacent pixels in each of the two line buffers. The pointer RPCNT is then increased by the value indicated by the four pointing registers PVDZ0, PVDZ1, PVDZ2 and PVDZ3.

Figure 5C:
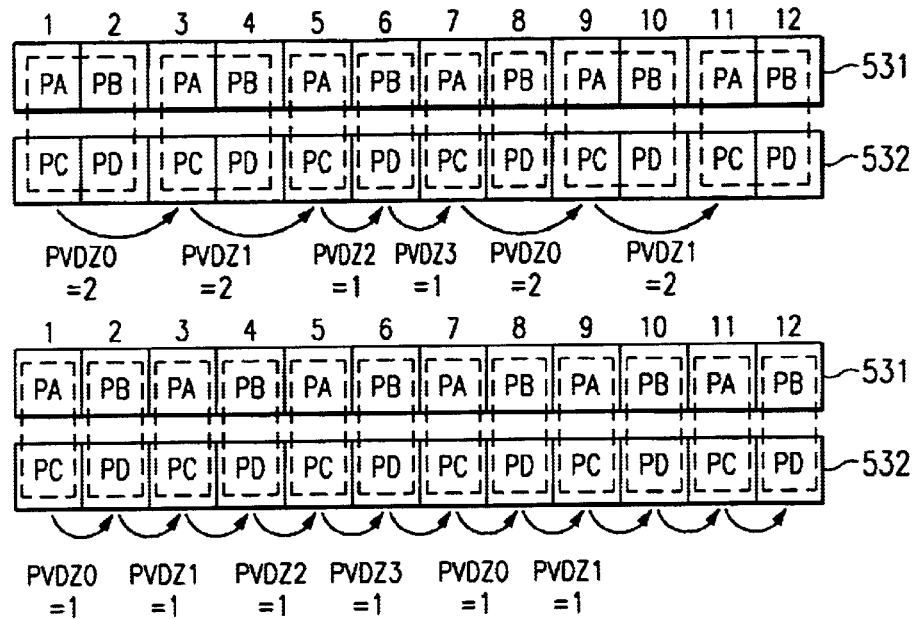
FIG. 5C shows sampling schemes of the horizontal up/down sampler of FIG. 2 in read-out mode according to the present invention.

Referring to FIG. 5C, if the pointing registers PVDZ0, PVDZ1, PVDZ2 and PVDZ3 store digital values of 10, 10, 01, 01, respectively, then every two gain-controlled pixels starting at locations numbered 1, 3, 5, 6, and 7, 9, 11 and so on, in the line buffers 531 and 532 will be read out. Every four pixels in square, denoted by PA, PB, PC, and PD in FIG. 5B, will be processed by the following circuit to produce three primary colors for one pixel. In the exemplary embodiment of FIG. 5C, since every six pixels will be processed to produce primary colors for four pixels, the resultant sampling rate is $2/3$ ($4/6$). Similarly, if the pointing registers PVDZ0, PVDZ1, PVDZ2 and PVDZ3 store digital values of 01, 01, 01, 01, respectively, then every two gain-controlled pixels starting at locations numbered 1, 2, 3, 4, and 5, and so on, in the line buffers 531 and 532 will be read out. Every four pixels in square, denoted by PA, PB, PC, and PD, will be processed by the following circuit to produce three primary colors for one pixel. In this case, since every four pixels will be processed to produce primary colors for four pixels, the resultant sampling rate is 1 ($4/4$). 2×Upsampling can be achieved by setting the pointing registers PVDZ0, PVDZ1, PVDZ2, and PVDZ3 to the values 01, 00, 01, 00, respectively. Every location is then sampled twice. Higher multiples of upsampling can be achieved in a similar manner.

As mentioned above, in addition to being performed at the time when the pixel signals are vertically down sampled in the vertical down sampler 51, persons skilled in the art will appreciate that gain control can also be performed after the horizontal up/down sampling is completed.

Figure 6A:
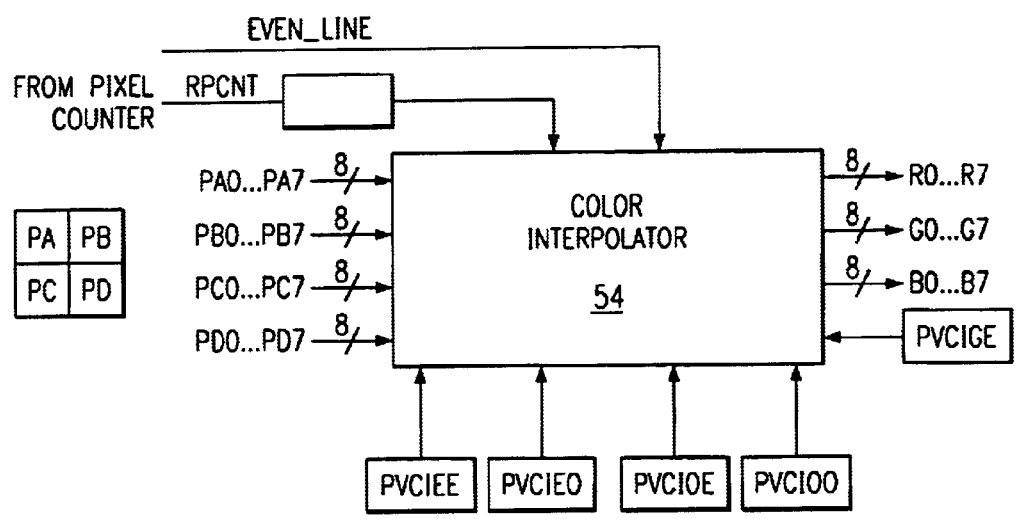
FIG. 6A shows the block diagram of the color interpolator of FIG. 2 according to the present invention.
Figure 6B:
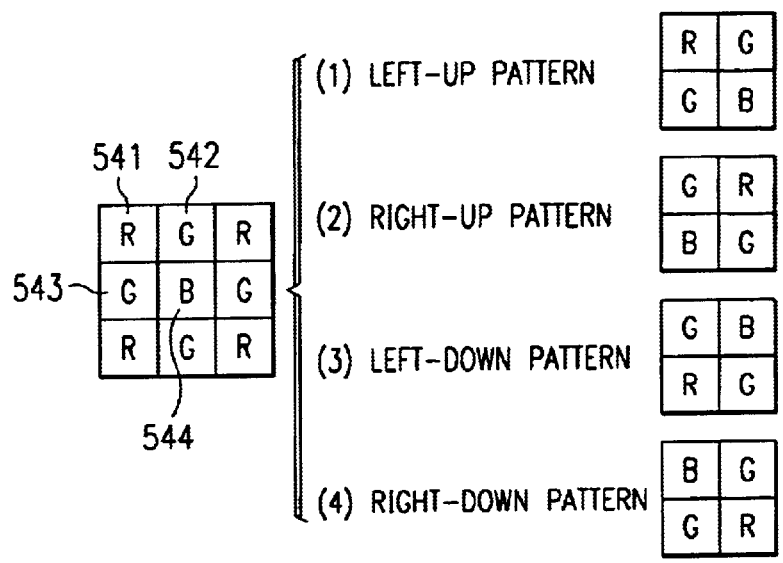
FIG. 6B shows the filter patterns used in the color interpolator of FIG. 2 according to the present invention.

As shown in FIG. 6A, the horizontally sampled pixel signals on a squared four-pixel basis represented by data lines PA0 ... PA7, PB0 ... PB7, PC0 ... PC7, and PD0 ... PD7, are sent to a color interpolator 54 to generate R, G, and B signals for each original image pixel on the CCD 2. Each CCD pixel can only be red, green, or blue, so it is important that the data coming into the color interpolator is sorted into the appropriate color category. The color interpolator 54 can support several types of CCD sensors such as RGB Bayer type, RGB stripe type, complementary type and so on. Take the Bayer pattern for example, the squared four pixels represented by the data lines PA0 ... PA7, PB0 ... PB7, PC0 ... PC7, and PD0 ... PD7 have four possible types of configuration as shown in FIG. 6B. Referring to FIG. 6A, four pattern registers PVCIEE, PVCIEO, PVCIOE, and PVCIOO programmable by the digital signal processor 10 are configured to control the four types of configuration, i.e., left-up pattern, right-up pattern, left-down pattern and right-down pattern, respectively. For example, the digital signal processor 10 may load (10,11,10,11) into one of the four pattern registers, each having 8 bits, to represent the left-up pattern, (R, G, B, G) arranged in a clockwise direction. The mechanism for how the current horizontally sampled pixel signals represented by the data lines PA0 ... PA7, PB0 ... PB7, PC0 ... PC7, and PD0 ... PD7 correspond to one of the four patterns shown in FIG. 6B is controlled by control signals even$_{13}$ line, as mentioned in the gain controller 52, or the horizontal up/down sampler 53 and RPCNT from the horizontal up/down sampler 53. After the pattern corresponding to the current horizontally sampled pixel signals is determined, the four pixels in that pattern will be utilized to uniquely determine the primary color R, G, and B signals for a single pixel. For example, if the left-up pattern is determined, three primary colors can be determined from the four pixels in that pattern for the pixel located at an odd pixel of an odd line (color R denoted by 541 in the Figure) as determined by the control signals even_line and RPCNT. Similarly, if the right-up pattern is determined, three primary colors can be determined from the four pixels in that pattern for the pixel located at an even pixel of an odd line (color G denoted by 542 in the Figure). When the left-down pattern is determined, three primary colors can be determined from the four pixels in that pattern for the pixel located at an odd pixel of an even line (color G denoted by 543 in the Figure). When the right-down pattern is determined, three primary colors can be determined from the four pixels in that pattern for the pixel located at an even pixel of an odd line (color B denoted by 544 in the Figure).

Figure 7:
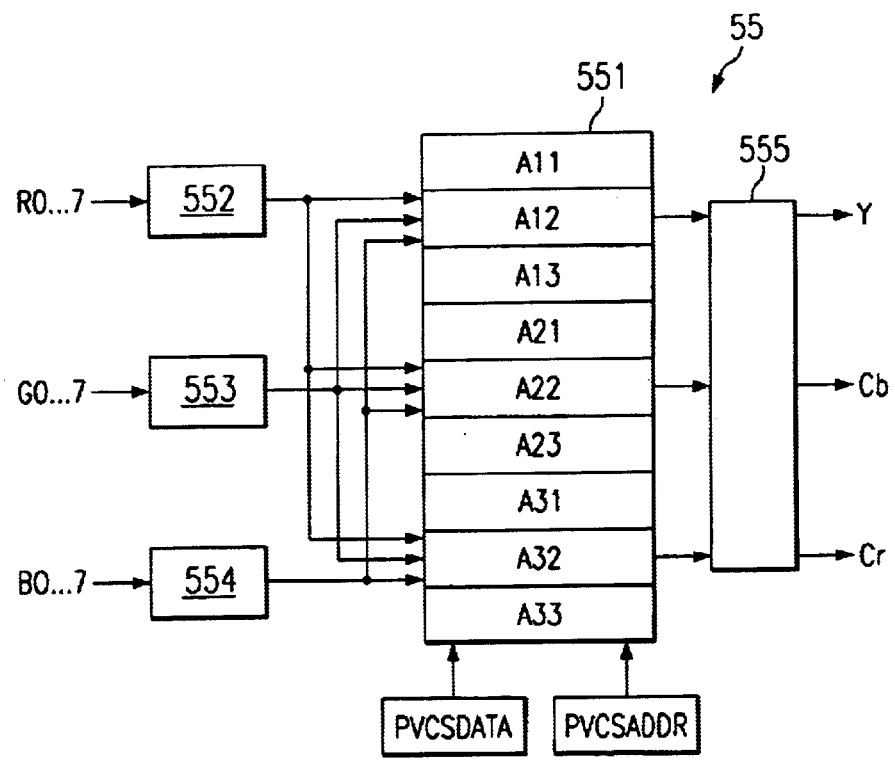
FIG. 7 shows the block diagram of the color space converter of FIG. 2 with gamma correction according to the present invention.

Referring to FIG. 7, according to one embodiment of the invention, the image display used in the preview mode of the invention is an NTSC compatible LCD or TV 11, the preview engine 5 further comprises a color space converter 55 to convert the image signals obtained from the RGB type CCD 2 into NTSC-compatible color-difference signals. The primary color signals for each single pixel signal from the color interpolator 54 are converted by a color space converter 55 to a luminance signal Y and the chroma signals Cb, Cr for complying with the format of the television signals in a TV or NTSC-compatible LCD. According to one embodiment of the present invention, the conversion of the R, G, and B signals into Y, Cb, and Cr in the color space converter 55 can be implemented by 3 by 3 matrix multiplication in which a dual-ported RAM, for example, is used as follows:

$$\begin{bmatrix} Y \\ Cb \\ Cr \end{bmatrix} = \begin{bmatrix} A11^{\frac{1}{\gamma}} & A12^{\frac{1}{\gamma}} & A13^{\frac{1}{\gamma}} \\ A21^{\frac{1}{\gamma}} & A22^{\frac{1}{\gamma}} & A23^{\frac{1}{\gamma}} \\ A31^{\frac{1}{\gamma}} & A32^{\frac{1}{\gamma}} & A33^{\frac{1}{\gamma}} \end{bmatrix} \cdot \begin{bmatrix} R \\ G \\ B \end{bmatrix}$$

where the coefficients of the conversion matrix A are stored in the dual-ported RAM and, for example, may be $$\begin{bmatrix} A11 & A12 & A13 \\ A21 & A22 & A23 \\ A31 & A32 & A33 \end{bmatrix} = \begin{bmatrix} 0.30 & 0.59 & 0.11 \\ 0.60 & -0.28 & -0.32 \\ 0.21 & -0.52 & 0.31 \end{bmatrix}$$

and γ is a gamma coefficient for color correction.

As with the gain controller 52 as shown in FIG. 4, according to the present invention, the color space converter 55 performs the 3 by 3 matrix multiplication by reading out the appropriate coefficients of the conversion matrix A from look-up table (LUT) 551. Use of a look-up table is again made advantageous because of the speed with which a digital signal processor can update the information in the table. For a practical application, the LUT 551 implemented by the dual-ported RAM is configured to have nine memory sections for those three primary colors, each of which has 256 locations corresponding to the 256 ($2^8$) intensity levels presented by the data lines R0 . . . R7, G0 . . . G7, and B0 . . . B7 for each pixel. In other words, the LUT 551 in effect has nine dedicated sub look-up tables (A11, A12, A13) (A21, A22, A23) or (A31, A32, A33) for the respective primary colors R, G or B. The LUT 551 can be programmed by the digital signal processor by means of two registers PVCS-DATA and PVCSADDR. The digital values in each of the 9×256 locations of the LUT 551 are pre-loaded by the digital signal processor via value register PVCSDATA and address register PVCSADDR. Upon operation, the color intensity of each of the pixel signals represented by the data lines R0 . . . R7, G0 . . . G7, and B0 . . . B7 is determined by color intensity measurers 552, 553, and 554, respectively to generate address signals corresponding to the measured color intensity. The converting coefficients addressed by the generated address signals are then sent to an adder 555 to perform the summation of all of the addressed converting coefficients and output at the data lines Y, Cb and Cr. As mentioned above, the digital values in any location of the LUT 551 can be programmable through the registers PVCS-DATA and PVCSADDR, such that the converting coefficients of the converting matrix A can be flexibly modified. For example, according to one embodiment of the present invention, the above coefficients of the conversion matrix A stored in the LUT 551 can be modified by incorporating the gamma correction curve data predetermined by the digital signal processor 10. The gamma correction is to correct the shift or deviation in gradation caused, for example, by nonlinear characteristics of the CCD 2.

According to another embodiment of the invention, alternatively, if the display 11 of the invention is an RGB type LCD, then all the coefficients of the conversion matrix A can be set to 1 by the digital signal processor 10.

As will be appreciated by persons skilled in the art, according to another embodiment of the invention, the gamma correction can also be performed in the gain controller 52 by incorporating the gamma correction effect predetermined by the digital signal processor 10. For example, the exponent 1/γ in the coefficients of the conversion matrix A can be factored into the 256 locations of the LUT 522. That is to say, the gain can be controlled by adjusting the average of intensity levels of any one color stored in the 256 locations of the LUT 522 and correcting each adjusted intensity level with a gamma correction factor to simultaneously achieve the gain control and gamma correction. Alternatively, the white balance adjustment performed in the gain controller 52 as mentioned above can also be operated in the above 3 by 3 matrix multiplication by correspondingly adjusting all the coefficients in the LUT 551 to average the color intensity of each of the primary color R, G, and B signals obtained from the color interpolator, given that the color intensity of each of the primary color R, G, and B signals obtained from the color interpolator has been determined by the digital signal processor 10.

Finally, an interfacing means 56 may reorganize the color difference signals Y, Cb, and Cr obtained from the color space converter 55 as television signals and generate the address of the television signals to the SDRAM 7.

In view of the above, according to the invention, at least one of white balance adjustment, and gamma correction can be performed simultaneously in either the gain controller 52 or the color space converter 55, thus providing a system with lower manufacturing costs, less complex structure, and more programmability than the prior art techniques in which any of the functions of white balance and gamma correction is either performed by a dedicated element or software. In addition, use of look-up table in conjunction with the processing speed of a digital signal processor makes real-time operation possible.

Although the invention has been disclosed in terms of a preferred embodiment of a digital still camera, the disclosure is not intended to limit the invention. The invention still can be modified, varied by persons skilled in the art without departing from the scope and spirit of the invention which is determined by the claims below.

What is claimed is:

1. A method for previewing an image in a camera prior to output, comprising the steps of:
    a) gathering image data;
    b) storing said image data;
    c) calculating display parameters using said stored image data;
    d) storing said display parameters in a look-up table;
    e) applying said display parameters in said look-up table to at least a portion of said image data to produce preview image data.

2. The method of claim 1, wherein said steps of calculating display parameters and storing said display parameters include the steps of:
    a) calculating a white balance adjustment and a gain control adjustment;
    b) combining said white balance and gain control adjustments; and
    c) storing said combined white balance adjustment and gain control adjustment in said look-up table.

3. The method of claim 1, wherein said steps of calculating display parameters and storing said display parameters include the steps of:
    a) calculating a gamma correction and performing color space conversion;
    b) combining said gamma correction and color space conversion; and
    c) storing said combined gamma correction and color space conversion in said look-up table.

4. The method of claim 3, further comprising the steps of:
a) calculating a white balance adjustment; and
b) storing said white balance adjustment with said combined gamma correction and color space conversion in said look-up table.

5. The method of claim 1, wherein said step of storing said image data includes the step of loading image data into a random access memory and said step of calculating includes the steps of:
using a digital signal processor to access said random access memory; and
using said digital signal processor to determine said display parameters using said image data in said random access memory in a preview algorithm.

6. The method of claim 1, wherein said steps are performed in real time.

7. A method for previewing an image in a digital camera prior to output, comprising the steps of:
a) gathering image data;
b) digitizing said image data;
c) storing said digitized image data;
d) sampling a portion of said digitized image data;
e) calculating white balance adjustment and gain control parameters using said stored digitized image data;
f) storing said white balance adjustment and gain control parameters in a look-up table; and
g) applying said white balance adjustment and gain control parameters in said look-up table to said portion of said digitized image data to produce preview image data.

8. The method of claim 7, further comprising the steps of:
calculating a gamma correction and performing color space conversion;
storing said gamma correction and said color space conversion in said look-up table; and
applying said gamma correction and said color space conversion in said look-up table to said portion of said image data to produce preview image data.

9. The method of claim 7, wherein said step of sampling comprises alternately loading said digitized image data into two line buffers and programmably selecting data from said line buffers.

10. A digital camera, comprising:
a) an image-gathering device;
b) a preview engine coupled to said image-gathering device, wherein said preview engine includes a look-up table and a color interpolator;
c) a display coupled to said preview engine;
d) a storage device coupled to said image-gathering device; and
e) a processor coupled to said look-up table and to said storage device.

11. A digital camera, comprising:
a) an image-gathering device;
b) a preview engine coupled to said image-gathering device, wherein said preview engine includes a look-up table and a sampling circuit;
c) a display coupled to said preview engine;
d) a storage device coupled to said image-gathering device; and
e) a processor coupled to said look-up table and to said storage device.

12. The digital camera of claim 11, wherein said sampling circuit comprises a circuit operable to sample image data in a predetermined direction, said circuit further comprising:
a line buffer coupled to said storage device and operable to receive and store data from said storage device;
a circuit for selecting data from said line buffer, said circuit coupled to said display.

13. The digital camera of claim 11, wherein said sampling circuit comprises a circuit operable to sample data in a predetermined direction, said circuit further comprising:
two line buffers coupled to said storage device and operable to receive and store data from said storage device;
a circuit for selecting blocks of data from said two line buffers, said circuit coupled to said display.

* * * * *